US012148357B2

(12) United States Patent
Sun

(10) Patent No.: US 12,148,357 B2
(45) Date of Patent: Nov. 19, 2024

(54) MLED DISPLAY PANEL AND TERMINAL DEVICE

(71) Applicant: TCL CHINA STAR OPTOELECTRONICS TECHNOLOGY CO., LTD., Guangdong (CN)

(72) Inventor: Bo Sun, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,980

(22) PCT Filed: Jul. 5, 2022

(86) PCT No.: PCT/CN2022/103866
§ 371 (c)(1),
(2) Date: Jul. 17, 2022

(87) PCT Pub. No.: WO2023/236299
PCT Pub. Date: Dec. 14, 2023

(65) Prior Publication Data
US 2024/0194121 A1 Jun. 13, 2024

(30) Foreign Application Priority Data
Jun. 7, 2022 (CN) ......................... 202210640473.2

(51) Int. Cl.
*G09G 3/32* (2016.01)

(52) U.S. Cl.
CPC ....... *G09G 3/32* (2013.01); *G09G 2300/0426* (2013.01); *G09G 2310/0264* (2013.01); *G09G 2330/021* (2013.01)

(58) Field of Classification Search
CPC ............. G09G 3/32; G09G 2300/0426; G09G 2310/0264; G09G 2330/021
See application file for complete search history.

(56) References Cited

U.S. PATENT DOCUMENTS 9,589,504 B2 * 3/2017 Qing .................... G09G 3/3233
10,204,554 B2 * 2/2019 Liu ...................... G09G 3/3233
(Continued)

FOREIGN PATENT DOCUMENTS

CN 103413519 A 11/2013
CN 113539183 A 10/2021
(Continued)

OTHER PUBLICATIONS

International Search Report in International application No. PCT/CN2022/103866, mailed on Dec. 14, 2022.
(Continued)

*Primary Examiner* — Bryan Earles
(74) *Attorney, Agent, or Firm* — PV IP PC; Wei Te Chung

(57) ABSTRACT

The present application relate to an MLED display panel, where a first end of the first transistor is electrically connected to a first end of the second transistor and one end of the capacitor, respectively; a second end of the first transistor is electrically connected to a third end of the second transistor and the other end of the capacitor, respectively; a second end of the second transistor is electrically connected to one end of the first light emitting module; and a third end of the first transistor is electrically connected to a first power supply voltage, and the other end of the first light emitting module is electrically connected to a second power supply voltage.

19 Claims, 7 Drawing Sheets

(56) References Cited

U.S. PATENT DOCUMENTS

| | | | | |
|---|---|---|---|---|
| 2017/0004776 | A1* | 1/2017 | Park | G09G 3/3233 |
| 2018/0182294 | A1 | 6/2018 | Radhakrishnan | |
| 2020/0234632 | A1* | 7/2020 | Lee | G09G 3/325 |
| 2020/0403131 | A1* | 12/2020 | Kim | H01L 25/167 |
| 2021/0134768 | A1* | 5/2021 | Lee | H01L 25/167 |
| 2022/0130325 | A1* | 4/2022 | Lee | H01L 33/24 |
| 2022/0293052 | A1* | 9/2022 | Lee | H01L 27/156 |
| 2023/0274696 | A1* | 8/2023 | Liu | H01L 27/156 345/212 |

FOREIGN PATENT DOCUMENTS

| | | | |
|---|---|---|---|
| CN | 113544763 | A | 10/2021 |
| CN | 113571005 | A | 10/2021 |
| JP | 2015043021 | A | 3/2015 |

OTHER PUBLICATIONS

Written Opinion of the International Search Authority in International application No. PCT/CN2022/103866, mailed on Dec. 14, 2022.

Chinese Office Action issued in corresponding Chinese Patent Application No. 202210640473.2 dated Dec. 2, 2022, pp. 1-8.

* cited by examiner

MLED DISPLAY PANEL AND TERMINAL DEVICE

TECHNICAL FIELD

The present application relates to a display technology field, and more particularly to an MLED display panel and a terminal device.

BACKGROUND

"MLED" is defined to include Mini-LED display technology and Micro-LED display technology. The Mini-LED display technology and the Micro-LED display technology are widely regarded as the next generation display technology after the TFT-LCD display technology, but there are some technical bottlenecks at present that are very difficult to break through, such as the stability of a driving circuit, the method of massive transfer, the yield, and the like.

In particular, with respect to the stability of the driving circuit, the stability of a thin film transistor (TFT) device is mainly concerned. In the TFT-LCD product, the requirement on the stability of the device is not high for the following reasons. Firstly, the TFT device functions to write a data-driven voltage signal into a pixel (i.e., Pixel) through an address switch operation, and since the voltage signal is written, as long as a charging current is sufficiently large to enable a capacitor to be charged to a specified voltage within the turn-on time, and thus the TFT device only has two operating states of on and off. In this case, a threshold voltage (i.e., Vth) of the TFT and the drift of the mobility are acceptable within a certain range of amplitude without affecting the normal display of a display. Secondly, in an LCD, the turn-on time the TFT device accounts for a small portion of the total time, and thus a current stress (i.e., stress) effect in the device is smaller. Thirdly, the LCD has to introduce a positive and negative frame inversion operation due to the limitation of a driving mode. In this case, the current directions of the TFT device between adjacent two frames are opposite, and the current stress effect is suppressed.

Therefore, in the Mini-LED and the Micro-LED, the current stress effect is more obvious than that of the LCD, more easily resulting in the drift of the performance of the TFT device. To this end, the related art provides two LEDs per pixel unit to receive the driving current, thereby realizing light emission to suppress the current stress effect. However, these two driving currents differ greatly, and the difference is particularly significant at low gray scale, thereby affecting the stability of the display circuit, and increasing the circuit power consumption.

Technical Problems

The present application mainly aims at the technical problem that the current stress effect of the MLED display panel is obvious.

Technical Solutions to the Problems

In view of this, Embodiments of the present application provide an MLED display panel and a terminal device, which can reduce a difference between driving currents in different directions, improve the symmetry and the stability of the circuit, reduce the current power effect of the driving device, thereby further reducing power consumption and simplifying the driving mode.

According to an aspect of the present application, there is provided an MLED display panel, comprising: a plurality of pixel driving circuits, wherein at least one of the pixel driving circuits comprises a first transistor, a second transistor, a capacitor, and a first light emitting assembly, and a first end of the first transistor is electrically connected to a first end of the second transistor and one end of the capacitor, respectively, to form a first internal node; a second end of the first transistor is electrically connected to a third end of the second transistor and the other end of the capacitor, respectively, to form a second internal node; a second end of the second transistor is electrically connected to one end of the first light emitting module; and a third end of the first transistor is electrically connected to a first power supply voltage, and other end of the first light emitting module is electrically connected to a second power supply voltage.

Further, at least one of the pixel driving circuits further includes a third transistor, wherein a first end of the third transistor is electrically connected to a corresponding scanning line, a second end of the third transistor is electrically connected to a corresponding data line, and a third end of the third transistor is electrically connected to the first internal node.

Further, at least one of the pixel driving circuits further includes a fourth transistor, wherein a first end of the fourth transistor is electrically connected to receive a sensing signal, a second end of the fourth transistor is electrically connected to the second internal node, and a third end of the fourth transistor is electrically connected to receive a reference signal.

Further, the first light emitting assembly comprises at least two light emitting components, wherein the at least two light emitting components are connected in parallel but in an opposite direction.

Further, an anode of at least one of the light emitting components is electrically connected to the second end of the second transistor, and a cathode of the at least one of the light emitting components is electrically connected to the second power supply voltage; or a cathode of at least one of the light emitting components is electrically connected to the second end of the second transistor, and an anode of the at least one of the light emitting components is electrically connected to the second power supply voltage.

Further, the first light emitting assembly comprises a first set of light emitting components and a second set of light emitting components, wherein the first set of light emitting components comprises at least two of the light emitting components and the second set of light emitting components comprises at least two of the light emitting components.

Further, all the light emitting components of the first set of light emitting components are sequentially connected in series and arranged in the same direction, and all the light emitting components of the second set of light emitting components are sequentially connected in series and arranged in the same direction.

Further, one end of the first set of light emitting components is electrically connected to the second end of the second transistor, and the other end of the first set of light emitting components is electrically connected to the second power supply voltage; or one end of the second set of light emitting components is electrically connected to the second end of the second transistor, and the other end of the second set of light emitting components is electrically connected to the second power supply voltage.

Further, any one of the first set of light emitting components is arranged in an opposite direction with any one of the second set of light emitting components.

Further, at least one of the pixel driving circuits further includes a second light emitting assembly, wherein one end of the second light emitting assembly is electrically connected to the first power supply voltage, and the other end of the second light emitting assembly is electrically connected to the third end of the first transistor.

Further, the second light emitting assembly comprises at least two light emitting components, wherein the at least two light emitting components are connected in parallel but in an opposite direction.

Further, an anode of at least one of the light emitting components is electrically connected to the third end of the first transistor, and a cathode of the at least one of the light emitting components is electrically connected to the first power supply voltage; or a cathode of at least one of the light emitting components is electrically connected to the third end of the first transistor, and an anode of the at least one of the light emitting components is electrically connected to the first power supply voltage.

Further, the second light emitting assembly comprises a third set of light emitting components and a fourth set of light emitting components, wherein the third set of light emitting components comprises at least two of the light emitting components and the fourth set of light emitting components comprises at least two of the light emitting components.

Further, all the light emitting components of the third set of light emitting components are sequentially connected in series and arranged in the same direction, and all the light emitting components of the fourth set of light emitting components are sequentially connected in series and arranged in the same direction.

Further, one end of the third set of light emitting components is electrically connected to the third end of the first transistor, and the other end of the third set of light emitting components is electrically connected to the first power supply voltage; or one end of the fourth set of light emitting components is electrically connected to the third end of the first transistor, and the other end of the fourth set of light emitting components is electrically connected to the first power supply voltage.

Further, any one of the third set of light emitting components is arranged in an opposite direction with any one of the fourth set of light emitting components.

Further, a first end of any one of the first transistors is a gate of the first transistor, a second end of any one of the first transistors is a source of the first transistor, and a third end of any one of the first transistors is a drain of the first transistor; and/or a first end of any one of the second transistors is a gate of the second transistor, a second end of any one of the second transistors is a drain of the second transistor, and a third end of any one of the second transistors is a source of the second transistor.

Further, the MLED display panel comprises a light emitting array comprising a plurality of light emitting units arranged in an array, wherein each of the light emitting units comprises a first light emitting assembly and/or a second light emitting assembly.

According to another aspect of the present application, there is provided a terminal device, including a terminal body and the MLED display panel, where the MLED display panel is connected to the terminal body.

According to another aspect of the present application, there is provided a driving method of an MLED display panel, wherein the driving method is configured to drive the MLED display panel and comprises: setting a first power supply voltage to a high level and a second power supply voltage to a low level in a first display period; and setting the first power supply voltage to the low level and the second power supply voltage to the high level in a second display period.

Beneficial Effects

According to various aspects of the present application, by providing the second transistor in at least one of the pixel driving circuits, and providing that the first end of the first transistor is electrically connected to the first end of the second transistor and one end of the capacitor, respectively; the second end of the first transistor is electrically connected to the third end of the second transistor and the other end of the capacitor, respectively; the second end of the second transistor is electrically connected to one end of the first light emitting module; and the third end of the first transistor is electrically connected to the first power supply voltage, and the other end of the first light emitting module is electrically connected to the second power supply voltage, it is possible to reduce the difference between driving currents in different directions, improve the symmetry and the stability of the circuit, reduce the current power effect of the driving device, thereby further reducing power consumption and simplifying the driving mode.

BRIEF DESCRIPTION OF THE DRAWINGS

Technical solutions and other beneficial effects of the present application are apparent below from detailed description of the embodiments of the present application in combination with the accompanying drawings.

EMBODIMENTS OF THE PRESENT DISCLOSURE

Figure 1:
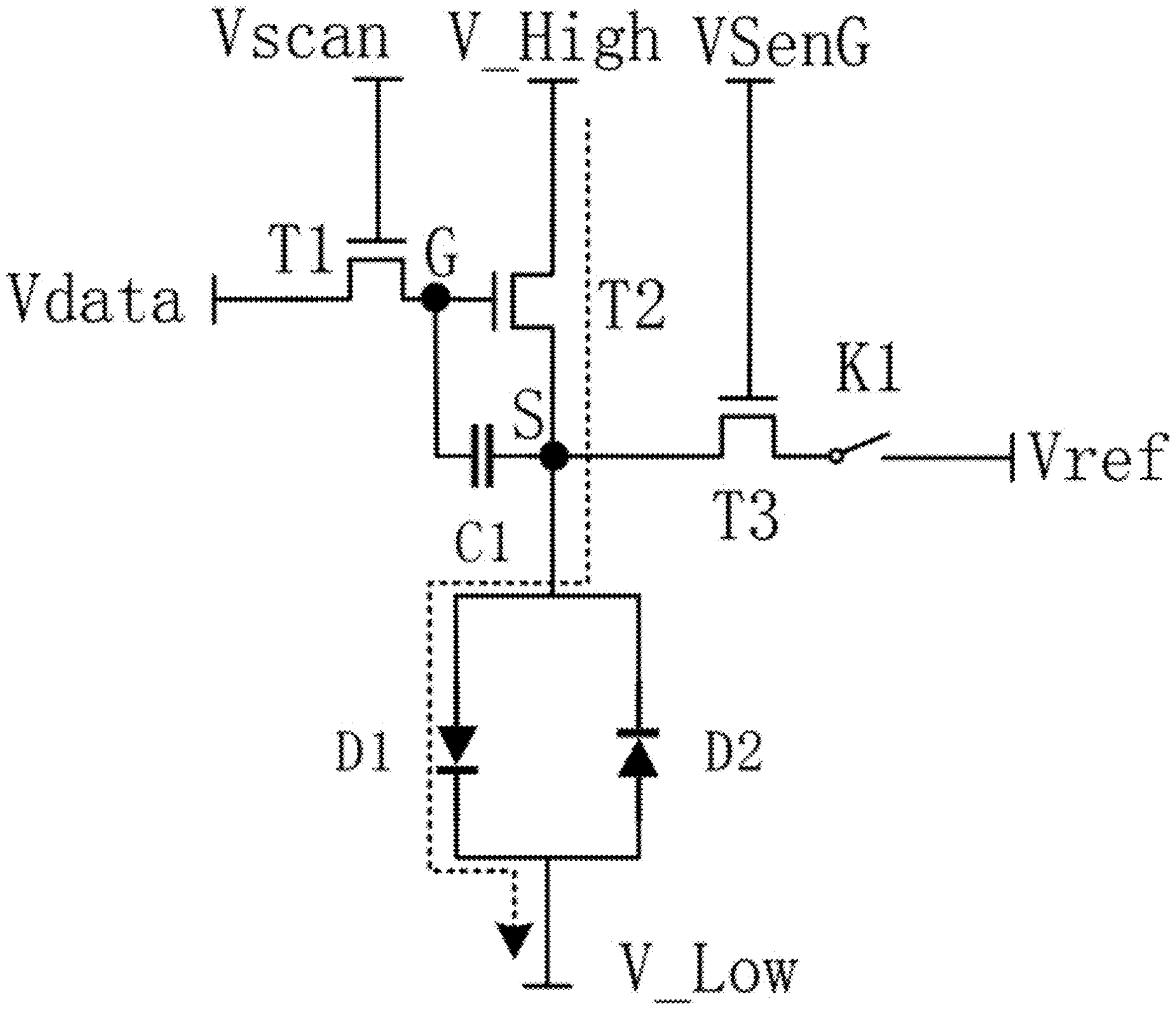
Prior Art FIG. 1
FIG. 1 shows a schematic diagram of a forward driving of an MLED circuit in the related art.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present application, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present application, rather than indicate or imply that the devices or elements referred to herein are required to have specific orientations or be constructed or operate in the specific orientations. Accordingly, the terms should not be construed as limiting the present application. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present application, the meaning of "plural" is two or more, unless otherwise specifically defined.

In the description of the present application, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those ordinary skilled in the art can understand the specific meanings of the above terms in the present application according to specific situations.

The following description provides various embodiments or examples for implementing various structures of the present application. To simplify the description of the present application, parts and settings of specific examples are described as follows. Certainly, they are only illustrative, and are not intended to limit the present application. Further, reference numerals and reference letters may be repeated in different examples. This repetition is for purposes of simplicity and clarity and does not indicate a relationship of the various embodiments and/or the settings. Furthermore, the present application provides specific examples of various processes and materials, however, applications of other processes and/or other materials may be appreciated those skilled in the art. In some instances, methods, means, elements, and circuits known to those skilled in the art are not described in detail in order to highlight the subject matter of the present application.

FIG. 1 shows a schematic diagram of a forward driving of an MLED circuit in the related art.

As shown in FIG. 1, the MLED circuit in the related art may be a 3T1C driving architecture. The driving architecture includes a transistor T1, a transistor T2, a transistor T3, and a storage capacitor C1.

Referring to FIG. 1, in the related art, a gate of the transistor T1 is electrically connected to receive a scanning signal, Vscan, a drain of the transistor T1 is electrically connected to receive a data signal, Vdata, and a source of the transistor T1 is electrically connected to a gate of the transistor T2 and one end of the capacitor C1, respectively, to form a first internal node G; and a source of the transistor T2 is electrically connected to a source of the transistor T3 and the other end of the capacitor C1, respectively, to form a second internal node S. The drain of the transistor T2 is electrically connected to a power supply voltage, V_High. An anode of the light emitting diode D1 and a cathode of the light emitting diode D2 are both electrically connected to the second internal node S, and the cathode of the light emitting diode D1 and the anode of the light emitting diode D2 are both electrically connected to a power supply voltage, V_Low. A gate of the transistor T3 is electrically connected to receive a sensing signal, VsenG, and a drain of the transistor T3 is electrically connected to a reference voltage Vref by a switch K1.

In actual operation, when the scanning signal, Vscan, is at a high level, the transistor T1 is turned on and in a conduction state between its source and drain. In this case, the data signal, Vdata, is written into the first internal node G through the transistor T1. The voltage of the first internal node G is pulled high, so that the transistor T2 is turned on and in the conduction state between its source and drain. In this case, a driving current starts to be generated between the source and the drain of the transistor T2 due to the presence of the power supply voltage, V_High, and the light emitting diode D1 emits light under the action of the driving current; and since the anode of the light emitting diode D2 is connected to V_Low, no driving current flows through the light emitting diode D2 and no light is emitted in the light emitting diode D2. Due to the presence of the storage capacitor C1, when the transistor T1 is turned off, the first internal node G can still be maintained at a high potential, so that the transistor T2 remains in an on state and the light emitting diode D1 continuously emits light.

Therefore, in the related art, the driving of the MLED circuit belongs to the current driving. When the data signal, Vdata, is changed, the voltage of the first internal node G as well as the second internal node S are changed, and then a gate-source voltage Vgs of the transistor T2 is changed, and the driving current between the source and the drain of the transistor T2 is also changed. Finally, the brightness adjustment of the corresponding light emitting diode is realized, thereby achieving the grayscale segmentation.

However, on the one hand, since the transistor T2 is in the on state for the entire display period, and the driving current of the transistor T2 needs to be precisely controlled to achieve the purpose of grayscale segmentation, when parameters of the transistor T2 such as the threshold voltage Vth and the mobility drift, which is directly applied to the driving current, the display abnormality occurs. Therefore, the MLED requires higher stability of the transistor device. On the other hand, in a general MLED circuit, V_High and V_Low are usually fixed voltages, and the transistor T2 is turned on for a long time, resulting in a fixed direction of the driving current. Under the action of two factors, that is, a long turn-on time and a fixed current direction, the stress effect of the driving current is very obvious, and the transistor device performance is more likely to drift.

Accordingly, the related art introduces a new driving mode, which introduces the concept of positive and negative frame inversion in LCD into the MLED driving. Specifically, referring to FIG. 1, one light emitting diode in a general MLED is added to two light emitting diodes.

Figure 2:
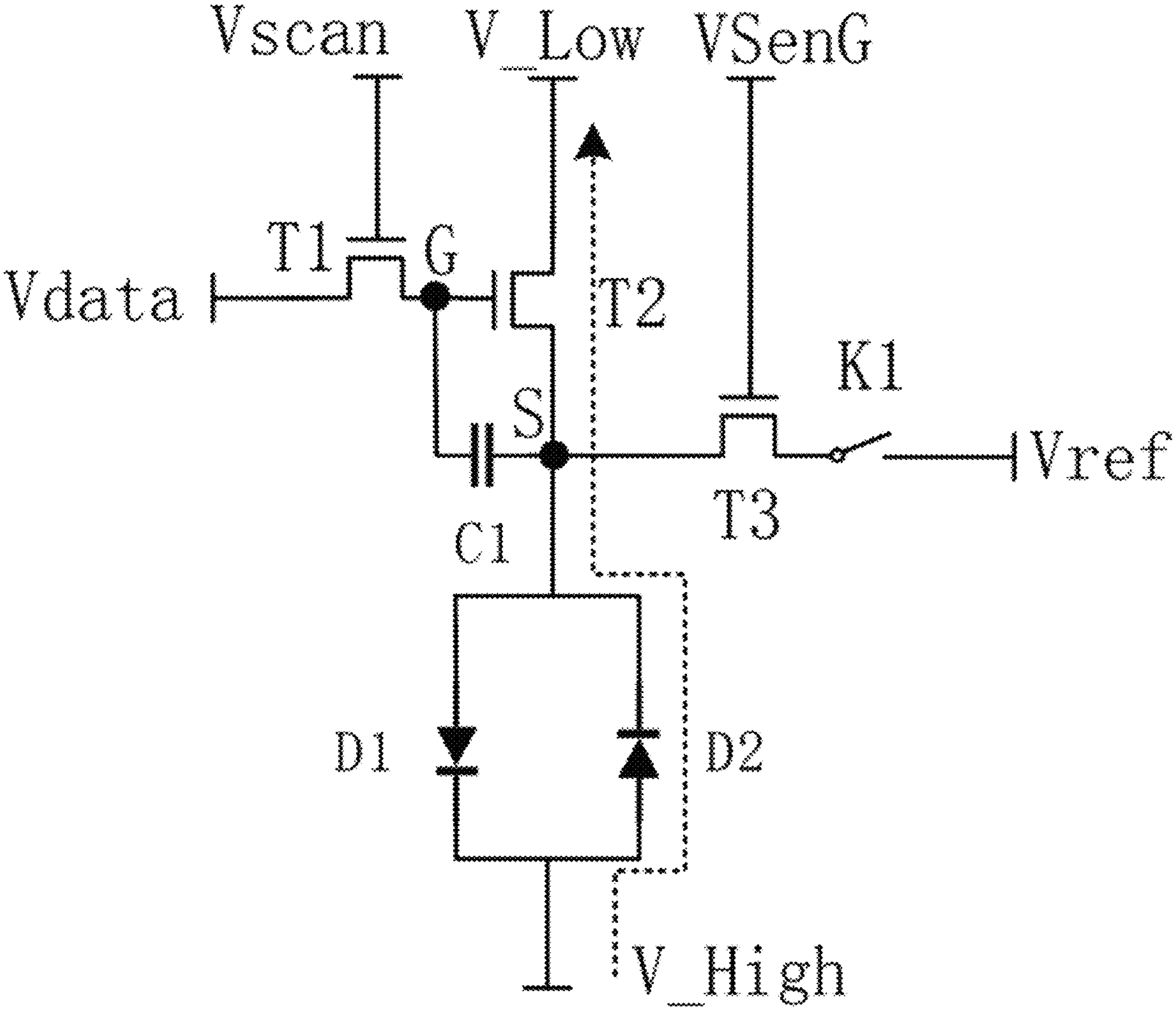
Prior Art FIG. 2
FIG. 2 shows a schematic diagram of a backward driving of an MLED circuit in the related art.

FIG. 2 shows a schematic diagram of a backward driving of an MLED circuit in the related art.

Referring to FIG. 2, a circuit configuration of FIG. 2 is the same as that of FIG. 1, except for the setting of the driving power supply. As can be seen in combination with FIGS. 1 and 2, the two light emitting diodes are connected in parallel but in an opposite direction, the power supply voltage is an alternating current signal, and the power supply voltage is interchanged in each frame. For example, in the Nth frame, the drain of the transistor T2 is connected to the power supply voltage, V_High, which is a high voltage. In this case, the driving current flows through the power supply voltage, V_High, the transistor T2, the light emitting diode D1, and the power supply voltage, V_Low, and the light emitting diode D1 is lighted and the light emitting diode D2 is not lighted. In the (N+1)-th frame, the drain of the transistor T2 is connected to the power supply voltage, V_Low, which is a low voltage. In this case, the driving current flows through the power supply voltage, V_Low, the light emitting diode D2, the transistor T2, and the power supply voltage, V_High, and the light emitting diode D1 is not lighted and the light emitting diode D2 is lighted.

Figure 3:
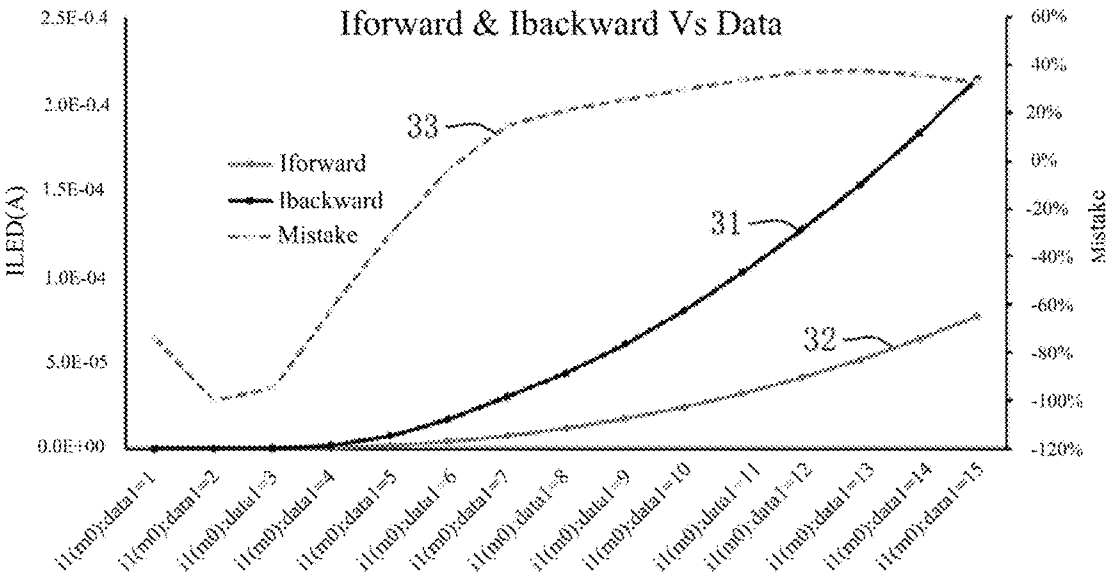
Prior Art FIG. 3
FIG. 3 shows a schematic diagram of an MLED driving current in the related art.

FIG. 3 shows a schematic diagram of an MLED driving current in the related art.

As shown in FIG. 3, in the related art, a horizontal coordinate may represent a gray scale input to the pixel unit which is related to a magnitude of the data signal, and a vertical coordinate ILED (A) on the left may represent a magnitude of the driving current flowing through the light emitting diode, and the Mistake on the right may represent a difference between a forward driving current Iforward and a backward driving current Ibackward, expressed as a percentage. For example, the grayscale may be divided into a total of fifteen levels 1-15, a curve 32 shows a forward driving current Iforward, a curve 31 shows a backward driving current Ibackward, and a curve 33 shows an error Mistake, and the error Mistake can be determined by the ratio of a difference obtained by subtracting the backward driving current from the forward driving current to the forward driving current.

It can be seen from FIG. 3 that the magnitudes of the forward driving current and the backward driving current are almost close to −100% at the low grayscale, the difference between the forward driving current and the backward driving current gradually becomes 0% as the grayscale is increased, and then the difference between the forward driving current and the backward driving current is also increased as the grayscale continues being increased.

Figure 4:
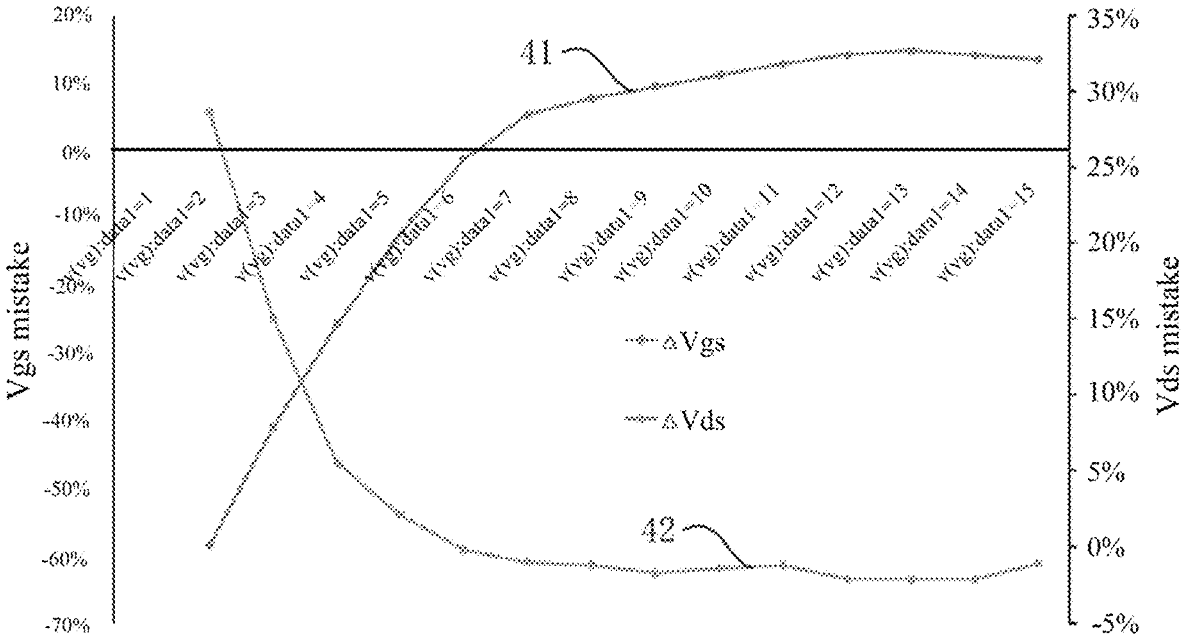
Prior Art FIG. 4
FIG. 4 shows a schematic diagram of an MLED driving voltage in the related art.

FIG. 4 shows a schematic diagram of an MLED driving voltage in the related art.

As shown in FIG. 4, in the related art, a curve 41 may represent a case where the drift ΔVgs of the gate-source voltage of the transistor T2 is varied with change of the grayscale, and a curve 42 may represent a case where the drift ΔVds of the source-drain voltage of the transistor T2 is varied with change of the grayscale. The grayscale change of the horizontal coordinate of FIG. 4 is similar to that of FIG. 3, and is not repeatedly described again. A vertical coordinate on the left of FIG. 4 may represent a ratio of the difference obtained by subtracting the value before drift of the gate-source voltage of the transistor T2 from the value after the drift to the value before the drift, and a vertical coordinate on the right of FIG. 4 may represent a ratio of the difference obtained by subtracting the value before drift of the source-drain voltage of the transistor T2 from the value after the drift to the value before the drift.

It can be seen from FIG. 4 that both the drift of the gate-source voltage and the drift of the source-drain voltage of the transistor T2 are severe at the low grayscale, while both the drift of the gate-source voltage and the drift of the source-drain voltage of the transistor T2 are relatively small at the high grayscale.

Thus, it can be seen from the above description of the related art that the related art reduces the current stress effect of the transistor T2 by means of the frame inversion concept in the LCD, thereby improving the stability of the device. In addition, since the two light emitting diodes are switched in turn to work, the light efficiency is reduced, the temperature of the light emitting diodes is not too high, and the current stress effect of the light emitting diodes is suppressed. Further, since each pixel is provided with two light emitting diodes, when one of the light emitting diodes is damaged, another light emitting diode can provide half of brightness, thereby reducing the influence of a bad point. Although the technical solution of the related art has the above-described advantages, it is found in actual operation that the forward current and the backward current of the related art differ greatly, and the difference is particularly obvious at the low gray level. This may affect the stability of the display circuit, thereby increasing the power consumption of the circuit, and Vref of the related art also requires AC driving to operate properly, which further increases the power consumption and complexity of the driving.

Figure 5:
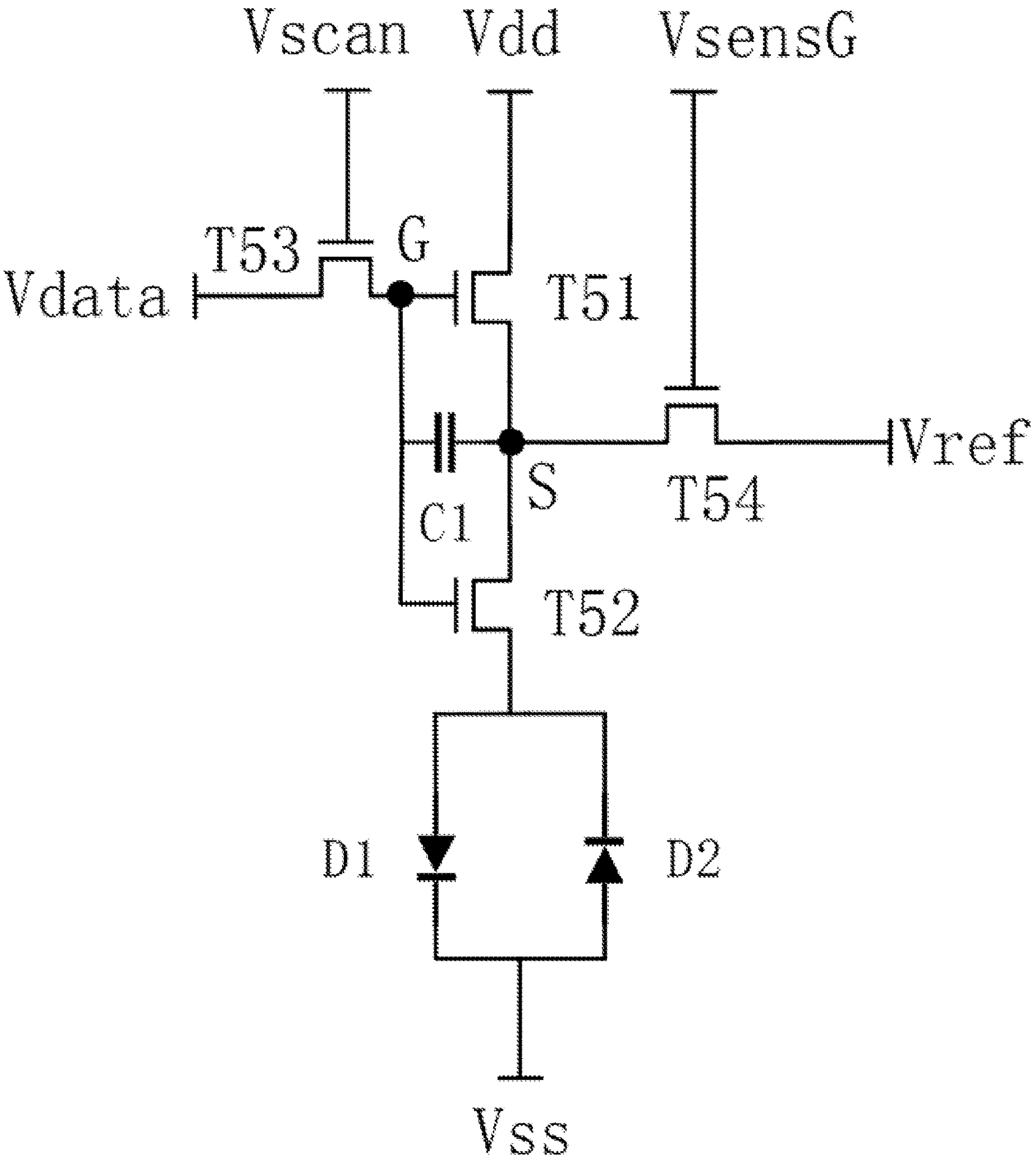
FIG. 5 shows a schematic diagram of a pixel driving circuit according to an embodiment of the present application.

In view of this, an embodiment of the present application provides an MLED display panel including a plurality of pixel driving circuits. FIG. 5 is a schematic diagram of a pixel driving circuit according to an embodiment of the present application.

As shown in FIG. 5, at least one of the pixel driving circuits includes a first transistor T51, a second transistor T52, a capacitor C1, and a first light emitting assembly, where a first end of the first transistor T51 is electrically connected to a first end of the second transistor T52 and one end of the capacitor C1, respectively, to form a first internal node G; a second end of the first transistor T51 is electrically connected to a third end of the second transistor T52 and the other end of the capacitor C1, respectively, to form a second internal node S; a second end of the second transistor T52 is electrically connected to one end of the first light emitting module.

Specifically, referring to FIG. 5, a second transistor T52 is provided in the embodiment of the present application in comparison with the related art. When a voltage G at the first internal node is boosted, the first transistor and the second transistor are both in the conduction state, so that the light emitting diode D1 emits light, and the light emitting diode D2 does not emit light. In this case, there is a source-drain voltage between the source and the drain of the first transistor, and there is also a source-drain voltage between the source and the drain of the second transistor. Therefore, the potential of the anode of the light emitting diode D1 is lower than in the related art, so that the backward voltage of the light emitting diode D2 is also lower, the backward current flowing through the light emitting diode D2 is also smaller, and the light emitting diode D2 is less prone to reverse breakdown. Similarly, when the light emitting diode D2 emits light and the light emitting diode D1 does not emit light, there is a source-drain voltage between the source and drain of the second transistor due to the arrangement of the second transistor T52, so that the potential of the anode of the light emitting diode D2 is lower than that of the related art, so that the backward voltage of the light emitting diode D1 is also lower, a backward current flowing through the light emitting diode D1 is also smaller, and the light emitting diode D1 is less prone to reverse breakdown. As a result, it is possible to reduce the difference between driving currents in different directions, improve the symmetry and the stability of the circuit, reduce the current power effect of the driving device, thereby further reducing power consumption and simplifying the driving mode.

Where the first light emitting components of the plurality of pixel driving circuits may be arranged in an array to form a light emitting array. One pixel driving circuit may be used to drive one or more rows of the first light emitting components, or may be used to drive one of the first light emitting components. It may be understood that the present application is not limited to the mapping relationship between the plurality of pixel driving circuits and the first light emitting components.

It should be noted in the present application that a first end of any one of the first transistors is a gate of the first transistor, a second end of any one of the first transistors is a source of the first transistor, and a third end of any one of the first transistors is a drain of the first transistor; and/or a first end of any one of the second transistors is a gate of the second transistor, a second end of any one of the second transistors is a drain of the second transistor, and a third end of any one of the second transistors is a source of the second transistor. That is, the transistor in the present application may be N-type or P-type. For example, the transistors in the present application may be thin film transistors (i.e., TFTs). It may be understood that the present application is not limited to the type of transistor.

Further, a third end of the first transistor is electrically connected to a first power supply voltage, and the other end of the first light emitting module is electrically connected to a second power supply voltage. For example, in FIG. 5, the drain of the first transistor T51 may be electrically connected to the first power supply voltage Vdd, while the other end of the first light emitting component is electrically connected to the second power supply voltage Vss. For example, the first power supply voltage is a high voltage, and the second power supply voltage is a low voltage. Specific values of the high voltage and the low voltage may be set according to actual needs, and the present application is not limited thereto.

Further, at least one of the pixel driving circuits further includes a third transistor, where a first end of the third transistor is electrically connected to a corresponding scanning line, a second end of the third transistor is electrically connected to a corresponding data line, and a third end of the third transistor is electrically connected to the first internal node. For example, a gate of the third transistor T53 is electrically connected to the corresponding scanning line, Vscan, a drain of the third transistor T53 is electrically connected to the corresponding data line, Vdata, and a source of the third transistor is electrically connected to the first internal node G.

Where the scanning line may be used to scan one line of pixels of the MLED display panel, or may be used to scan a plurality of lines of pixels of the MLED display panel. For example, two light emitting diodes of FIG. 5 may be disposed in each pixel of the MLED display panel. The data signals on the data lines may be adjusted according to actual needs. It may be understood that the present application is not limited to the pixel architecture of the MLED display panel.

Further, at least one of the pixel driving circuits further includes a fourth transistor, where a first end of the fourth transistor is electrically connected to receive a sensing signal, a second end of the fourth transistor is electrically connected to the second internal node, and a third end of the fourth transistor is electrically connected to receive a reference signal. For example, in FIG. 5, a gate of the fourth transistor T54 is electrically connected to receive a sensing signal, VsensG, a source of the fourth transistor T54 may be electrically connected to the second internal node S, and a drain of the fourth transistor T54 may be electrically connected to receive a reference signal Vref.

Where the sensing signal, VsensG, may be emitted by an external device (e.g., a processor) for controlling whether to detect the voltage of the second internal node S so as to proceed to the next processing with the external device. When the sensing signal is a high level, the fourth transistor T54 is turned on, and the voltage of the second internal node S may be sent to other devices for further processing.

Further, the first light emitting assembly comprises at least two light emitting components, wherein the at least two light emitting components are connected in parallel but in an opposite direction. As shown in FIG. 5, the first light emitting assembly may include two light emitting components, which are respectively a light emitting diode D1 and a light emitting diode D2, and the light emitting diode D1 and the light emitting diode D2 are disposed in an opposite direction. It should be noted that the number of light emitting diodes included in the first light emitting assembly may be another number. For example, the first light emitting assembly may further include a light emitting diode D1, a light emitting diode D2, a light emitting diode D1', and a light emitting diode D2'. In this case, the light emitting diode D1 may be disposed in an opposite direction with the corresponding light emitting diode D1', and the light emitting diode D2 may be disposed in an opposite direction with the corresponding light emitting diode D2'.

Since the first light emitting assembly includes at least two light emitting diodes connected in parallel but in an opposite direction, the embodiment of the present application can reduce the backward voltage of the diode in a backward state, further reduce the backward current of the diode in the backward state, further reduce the difference between the driving currents in different directions, improve the symmetry and the stability of the circuit, reduce the current power effect of the driving device, thereby further reducing the power consumption and simplifying the driving mode.

Further, an anode of at least one of the light emitting components is electrically connected to the second end of the second transistor, and a cathode of the at least one of the light emitting components is electrically connected to the second power supply voltage; or a cathode of at least one of the light emitting components is electrically connected to the second end of the second transistor, and an anode of the at least one of the light emitting components is electrically connected to the second power supply voltage. For example, in FIG. 5, an anode of the light emitting diode D1 is electrically connected to the source of the second transistor T52, and a cathode of the light emitting diode D1 is electrically connected to the second power supply voltage Vss; and a cathode of the light emitting diode D2 is electrically connected to the second end of the second transistor T52, and an anode of the light emitting diode D2 is electrically connected to the second power supply voltage Vss.

Figure 6:
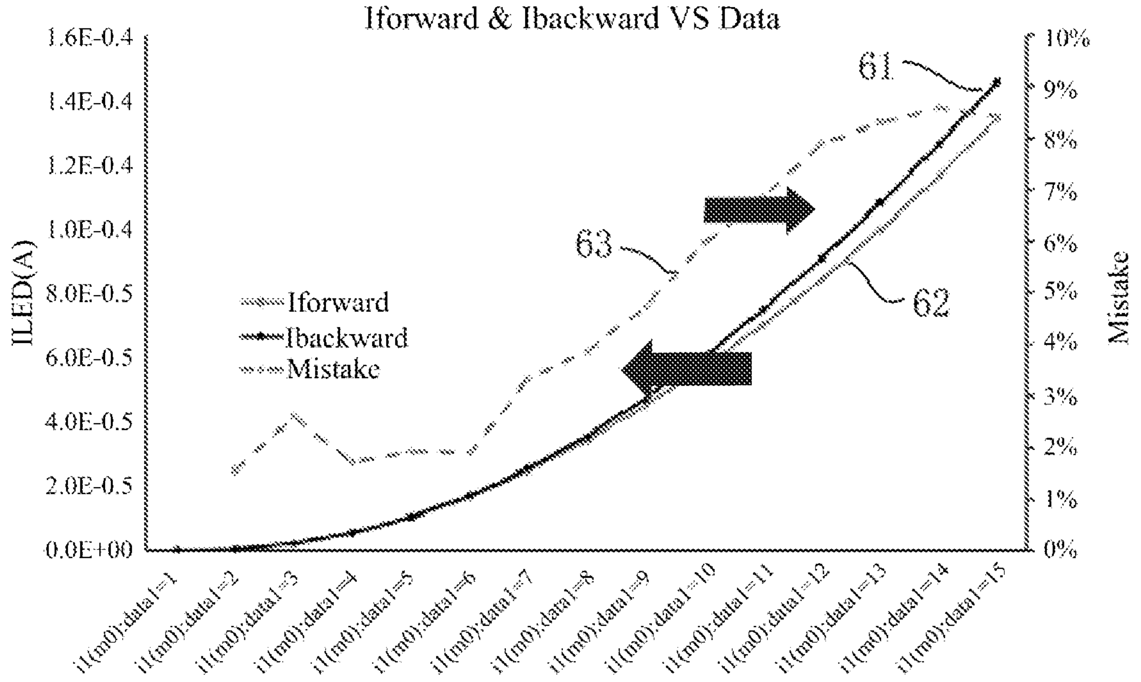
FIG. 6 shows a schematic diagram of an MLED driving current according to an embodiment of the present application.

FIG. 6 shows a schematic diagram of an MLED driving current according to an embodiment of the present application.

As shown in FIG. 6, 61 represents a forward driving current Iforward of the embodiment of the present application, 62 represents a backward driving current Ibackward of the embodiment of the present application, and 63 represents a difference Mistake between the forward driving current Iforward and the backward driving current Ibackward.

FIG. 6 is a diagram based on the pixel driving circuit of FIG. 5. It can be seen that since a second transistor T52 is added in FIG. 5, the symmetry of the circuit is greatly improved. Compared with the related art, the difference between the forward driving current and the backward driving current is greatly reduced, especially as low as about 2% at low grayscale, and the actual demand can be met. Further, based on the circuit architecture optimized in FIG. 5, the reference voltage Vref does not need AC driving, and the AC driving of the Vref voltage is changed to DC driving, which can further reduce power consumption and the complexity of the driving, and improve the stability of the driving device.

Further, at least one of the pixel driving circuits further includes a second light emitting assembly, wherein one end of the second light emitting assembly is electrically connected to the first power supply voltage, and the other end of the second light emitting assembly is electrically connected to the third end of the first transistor.

Figure 7:
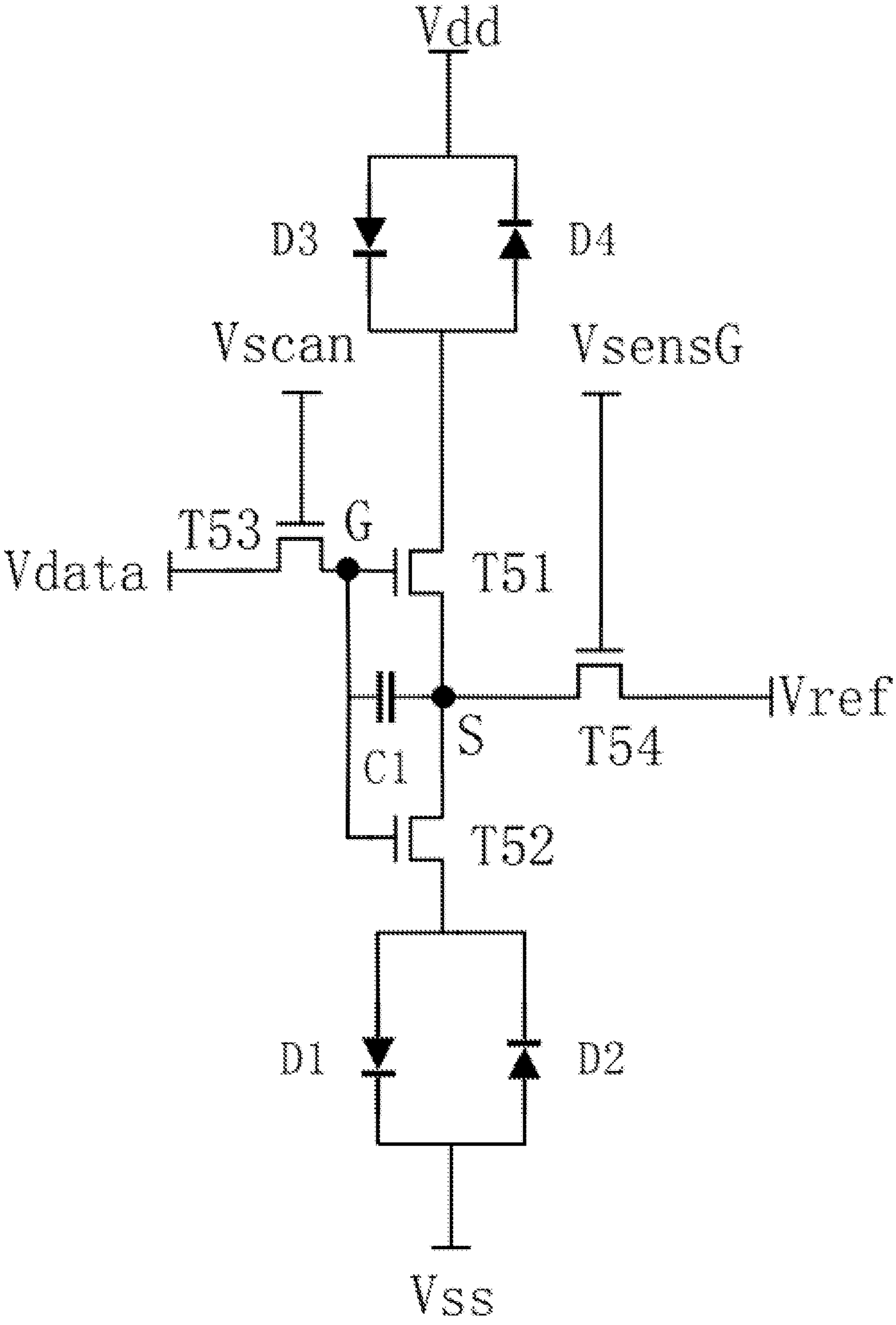
FIG. 7 shows a schematic diagram of a pixel driving circuit according to an embodiment of the present application.

FIG. 7 shows a schematic diagram of a pixel driving circuit according to an embodiment of the present application.

As shown in FIG. 7, the second light emitting assembly may be newly added in the embodiment of the present application on the basis of FIG. 5. For example, in FIG. 7, one end of the second light emitting component may be electrically connected to the first power supply voltage Vdd, and the other end of the second light emitting component may be electrically connected to the drain of the first transistor T51.

Further, the second light emitting assembly includes at least two light emitting components, where the at least two light emitting components are connected in parallel but in an opposite direction. As shown in FIG. 7, the second light emitting assembly may include two light emitting components, which are respectively a light emitting diode D3 and a light emitting diode D4, and the light emitting diode D3 and the light emitting diode D4 are disposed in an opposite direction. It should be noted that the number of light emitting diodes included in the second light emitting assembly may be another number. For example, the second light emitting assembly may further include a light emitting diode D3, a light emitting diode D4, a light emitting diode D3', and a light emitting diode D4'. In this case, the light emitting diode D3 may be disposed in an opposite direction with the corresponding light emitting diode D3', and the light emitting diode D4 may be disposed in an opposite direction with the corresponding light emitting diode D4'.

Further, an anode of at least one of the light emitting components is electrically connected to the third end of the first transistor, and a cathode of the at least one of the light emitting components is electrically connected to the first power supply voltage; or a cathode of at least one of the light emitting components is electrically connected to the third end of the first transistor, and an anode of the at least one of the light emitting components is electrically connected to the first power supply voltage. For example, in FIG. 7, an anode of the light emitting diode D4 is electrically connected to the drain of the first transistor T51, and a cathode of the light emitting diode D4 is electrically connected to the first power supply voltage Vdd; and the cathode of the light emitting diode D3 is electrically connected to the drain of the first transistor T51, and the anode of the light emitting diode D3 is electrically connected to the first power supply voltage Vdd.

Where, inversely parallel connected LED lamps may adopt a PKG punching mode to reduce the cost. The inversely parallel connected design of the present application can be extended to various internal compensation and external compensation circuits of a display panel, and applied to Mini-LED and Micro-LED backlight or direct display products, even OLED display products. It may be understood that the present application is not limited to the application scenario of the pixel driving circuit.

Since the second light emitting assembly is added to the present application, when the voltage G at the first internal node voltage is boosted, both the first transistor and the second transistor are in the conduction state. In this case, both the light emitting diode D3 and the light emitting diode D1 emit light, and neither the light emitting diode D2 nor the light emitting diode D4 emit light. Since D1 and D3 are symmetrical about the first internal node G and D2 and D4 are symmetrical about the first inner node G, the backward current flowing through D2 and D4 will be smaller in operation, thereby making D2 and D4 less prone to reverse breakdown; similarly, when both the light emitting diode D2 and the light emitting diode D4 emit light, and the light emitting diode D1 and the light emitting diode D3 do not emit light, since D1 and D3 are symmetrical about the first internal node G and D2 and D4 are symmetrical about the first internal node G, the backward current flowing through D1 and D3 is smaller in operation, thereby making D1 and D3 less likely to be reverse breakdown. In addition, the voltage drop of D3 and D4 itself may also compress the backward voltage of the diode in the backward state lower. Therefore, the second light emitting assembly provided in the present application can further reduce a difference between driving currents in different directions, improve the symmetry and the stability of the circuit, reduce the current power effect of the driving device, thereby further reducing power consumption and simplifying the driving mode.

Figure 8:
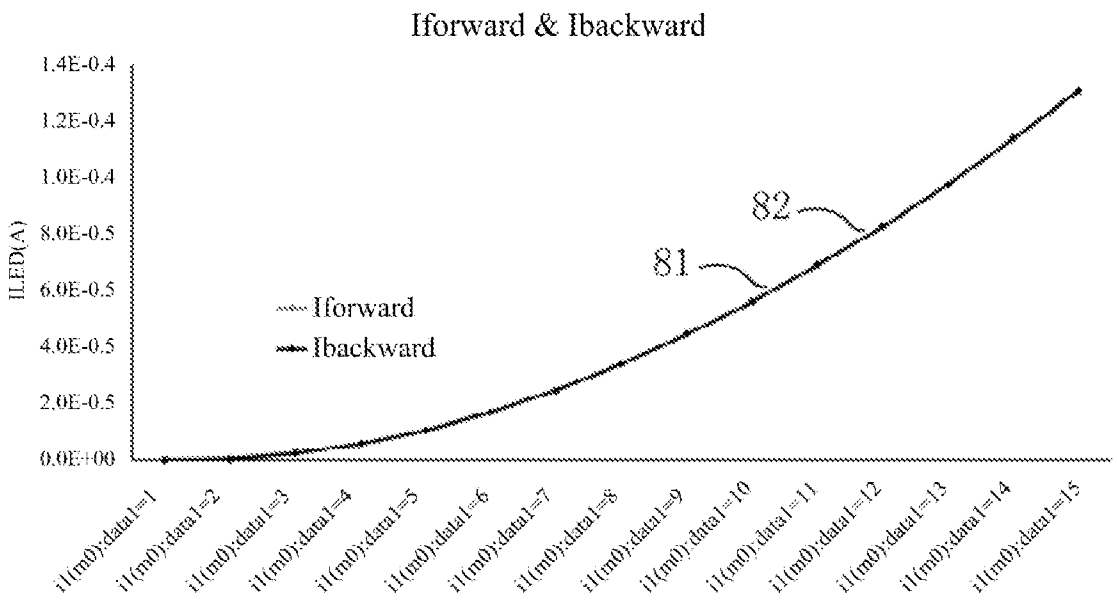
FIG. 8 shows a schematic diagram of an MLED driving current according to an embodiment of the present application.

FIG. 8 shows a schematic diagram of an MLED driving current according to an embodiment of the present application.

FIG. 8 is similar to the representation of FIG. 6, with 81 representing the forward driving current and 82 representing the backward driving current. As shown in FIG. 8, based on the architecture of FIG. 7, the symmetry of the circuit can be further improved by adding a second light emitting assembly to the first light emitting assembly. In this case, the forward driving current is almost completely equal to the backward driving current, and there is no difference therebetween, thereby improving the consistency between the forward driving current and the backward driving current.

Upon description of the present application, it is found that the asymmetry of the circuit is an important factor affecting the current stress effect and driving stability in the related art. In addition, in the circuit architecture of the related art, AC driving is also required to operate normally, which increases driving power consumption and complexity. Therefore, by providing the second transistor and/or adding the light emitting assembly, embodiments of the present application can reduce a difference between driving currents in different directions, improve the symmetry and the stability of the circuit, reduce the current power effect of the driving device, thereby further reducing power consumption and simplifying the driving mode.

According to another aspect of the present application, there is provided a terminal device, including a terminal body and the MLED display panel, where the MLED display panel is connected to the terminal body. Specific details of the terminal device may refer to the MLED display panel and are not repeatedly described again.

In conclusion, by providing the second transistor in at least one of the pixel driving circuits, and providing that the first end of the first transistor is electrically connected to the first end of the second transistor and one end of the capacitor, respectively; the second end of the first transistor is electrically connected to the third end of the second transistor and the other end of the capacitor, respectively; the second end of the second transistor is electrically connected to one end of the first light emitting module; and the third end of the first transistor is electrically connected to the first power supply voltage, and the other end of the first light emitting module is electrically connected to the second power supply voltage, the embodiments of the present application can reduce the difference between driving currents in different directions, improve the symmetry and the stability of the circuit, reduce the current power effect of the driving device, thereby further reducing power consumption and simplifying the driving mode.

In the foregoing embodiments, descriptions of the embodiments are emphasized. A portion that is not described in detail in an embodiment may refer to related descriptions in another embodiment.

The MLED display panel and the terminal device provided in the embodiments of the present application are described in detail above. In this specification, principles and implementations of the present application are illustrated by applying specific examples herein. The description of the above embodiments is only used to help understand the technical solutions and core ideas of the present application; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present application.

What is claimed is:

1. An MLED display panel, comprising a plurality of pixel driving circuits, wherein at least one of the pixel driving circuits comprises a first transistor, a second transistor, a capacitor, and a first light emitting assembly, wherein, a first end of the first transistor is electrically connected to a first end of the second transistor and one end of the capacitor, respectively, to form a first internal node;

a second end of the first transistor is electrically connected to a third end of the second transistor and the other end of the capacitor, respectively, to form a second internal node;

a second end of the second transistor is electrically connected to one end of the first light emitting module; and a third end of the first transistor is electrically connected to a first power supply voltage, and the other end of the first light emitting module is electrically connected to a second power supply voltage, wherein at least one of the pixel driving circuits further comprises a second light emitting assembly, wherein one end of the second light emitting assembly is electrically connected to the first power supply voltage, and the other end of the second light emitting assembly is electrically connected to the third end of the first transistor.

2. The MLED display panel of claim 1, wherein at least one of the pixel driving circuits further comprises a third transistor, wherein, a first end of the third transistor is electrically connected to a corresponding scanning line, a second end of the third transistor is electrically connected to a corresponding data line, and a third end of the third transistor is electrically connected to the first internal node.

3. The MLED display panel of claim 1, wherein at least one of the pixel driving circuits further comprises a fourth transistor, wherein, a first end of the fourth transistor is electrically connected to receive a sensing signal, a second end of the fourth transistor is electrically connected to the second internal node, and a third end of the fourth transistor is electrically connected to receive a reference signal.

4. The MLED display panel of claim 1, wherein the first light emitting assembly comprises at least two light emitting components, wherein the at least two light emitting components are connected in parallel but in an opposite direction.

5. The MLED display panel of claim 4, wherein an anode of at least one of the light emitting components is electrically connected to the second end of the second transistor, and a cathode of the at least one of the light emitting components is electrically connected to the second power supply voltage;

and a cathode of at least one of the light emitting components is electrically connected to the second end of the second transistor, and an anode of the at least one of the light emitting components is electrically connected to the second power supply voltage.

6. The MLED display panel of claim 4, wherein the first light emitting assembly comprises a first set of light emitting components and a second set of light emitting components, wherein the first set of light emitting components comprises at least two of the light emitting components and the second set of light emitting components comprises at least two of the light emitting components.

7. The MLED display panel of claim 6, wherein all the light emitting components of the first set of light emitting components are sequentially connected in series and arranged in the same direction, and all the light emitting components of the second set of light emitting components are sequentially connected in series and arranged in the same direction.

8. The MLED display panel of claim 6, wherein one end of the first set of light emitting components is electrically connected to the second end of the second transistor, and the other end of the first set of light emitting components is electrically connected to the second power supply voltage; or one end of the second set of light emitting components is electrically connected to the second end of the second transistor, and the other end of the second set of light emitting components is electrically connected to the second power supply voltage.

9. The MLED display panel of claim 6, wherein any one of the first set of light emitting components is arranged in an opposite direction with any one of the second set of light emitting components.

10. The MLED display panel of claim 1, wherein the first light emitting assembly comprises at least two light emitting components, wherein the at least two light emitting components are connected in parallel but in an opposite direction.

11. The MLED display panel of claim 10, wherein an anode of at least one of the light emitting components is electrically connected to the third end of the first transistor, and a cathode of the at least one of the light emitting components is electrically connected to the first power supply voltage;

and a cathode of at least one of the light emitting components is electrically connected to the third end of the first transistor, and an anode of the at least one of the light emitting components is electrically connected to the first power supply voltage.

12. The MLED display panel of claim 10, wherein the second light emitting assembly comprises a third set of light emitting components and a fourth set of light emitting components, wherein the third set of light emitting components comprises at least two of the light emitting components and the fourth set of light emitting components comprises at least two of the light emitting components.

13. The MLED display panel of claim 12, wherein all the light emitting components of the third set of light emitting components are sequentially connected in series and arranged in the same direction, and all the light emitting components of the fourth set of light emitting components are sequentially connected in series and arranged in the same direction.

14. The MLED display panel of claim 12, wherein one end of the third set of light emitting components is electrically connected to the third end of the first transistor, and the other end of the third set of light emitting components is electrically connected to the first power supply voltage; or one end of the fourth set of light emitting components is electrically connected to the third end of the first transistor, and the other end of the fourth set of light emitting components is electrically connected to the first power supply voltage.

15. The MLED display panel of claim 12, wherein any one of the third set of light emitting components is arranged in an opposite direction with any one of the fourth set of light emitting components.

16. The MLED display panel of claim 1, wherein a first end of any one of the first transistors is a gate of the first transistor, a second end of any one of the first transistors is a source of the first transistor, and a third end of any one of the first transistors is a drain of the first transistor; and/or a first end of any one of the second transistors is a gate of the second transistor, a second end of any one of the second transistors is a drain of the second transistor, and a third end of any one of the second transistors is a source of the second transistor.

17. The MLED display panel of claim 1, wherein the MLED display panel comprises a light emitting array comprising a plurality of light emitting units arranged in an array, wherein each of the light emitting units comprises a first light emitting assembly and/or a second light emitting assembly.

18. A terminal device, comprising a terminal body and an MLED display panel comprising a plurality of pixel driving circuits, wherein at least one of the pixel driving circuits comprises a first transistor, a second transistor, a capacitor, and a first light emitting assembly, wherein, a first end of the first transistor is electrically connected to a first end of the second transistor and one end of the capacitor, respectively, to form a first internal node;

a second end of the first transistor is electrically connected to a third end of the second transistor and the other end of the capacitor, respectively, to form a second internal node;

a second end of the second transistor is electrically connected to one end of the first light emitting module; and a third end of the first transistor is electrically connected to a first power supply voltage, and the other end of the first light emitting module is electrically connected to a second power supply voltage, wherein the MLED display panel is connected to the terminal body, wherein at least one of the pixel driving circuits further comprises a second light emitting assembly, wherein one end of the second light emitting assembly is electrically connected to the first power supply voltage, and the other end of the second light emitting assembly is electrically connected to the third end of the first transistor.

19. A driving method of an MLED display panel, wherein the driving method is configured to drive an MLED display panel comprising a plurality of pixel driving circuits, wherein at least one of the pixel driving circuits comprises a first transistor, a second transistor, a capacitor, and a first light emitting assembly, wherein, a first end of the first transistor is electrically connected to a first end of the second transistor and one end of the capacitor, respectively, to form a first internal node;

a second end of the first transistor is electrically connected to a third end of the second transistor and the other end of the capacitor, respectively, to form a second internal node;

a second end of the second transistor is electrically connected to one end of the first light emitting module; and a third end of the first transistor is electrically connected to a first power supply voltage, and the other end of the first light emitting module is electrically connected to a second power supply voltage, and wherein at least one of the pixel driving circuits further comprises a second light emitting assembly, wherein one end of the second light emitting assembly is electrically connected to the first power supply voltage, and the other end of the second light emitting assembly is electrically connected to the third end of the first transistor, the driving method comprises:

setting a first power supply voltage to a high level and a second power supply voltage to a low level in a first display period; and setting the first power supply voltage to the low level and the second power supply voltage to the high level in a second display period.

* * * * *